(12) United States Patent
Mayes

(10) Patent No.: US 8,590,918 B1
(45) Date of Patent: Nov. 26, 2013

(54) ROTARY TOW COUPLING

(75) Inventor: Bradley J. Mayes, Knoxville, TN (US)

(73) Assignee: Roto-Hitch, LLC, Knoxville, TN (US)

( * ) Notice: Subject to any disclaimer, the term of this patent is extended or adjusted under 35 U.S.C. 154(b) by 0 days.

(21) Appl. No.: 13/547,132

(22) Filed: Jul. 12, 2012

(51) Int. Cl.
 *B60D 1/44* (2006.01)
(52) U.S. Cl.
 USPC .................. 280/469; 280/467; 280/468
(58) Field of Classification Search
 USPC .......................... 280/467, 468, 469
 See application file for complete search history.

(56) References Cited

U.S. PATENT DOCUMENTS 3,984,018 A * 10/1976 van der Lely ............ 414/501
4,123,082 A * 10/1978 Conner ..................... 280/467

* cited by examiner

*Primary Examiner* — Kevin Hurley
*Assistant Examiner* — Marc A Scharich
(74) *Attorney, Agent, or Firm* — J. Kenneth Hoffmeister; Merchant & Gould

(57) ABSTRACT

A rotary tow coupling. The rotary tow coupling changes the angular orientation of a trailer relative to a tow vehicle without moving the tow vehicle. The rotary tow coupling is fixedly secured to the tow vehicle. The rotary tow coupling includes a hitch connectable to a trailer coupling. The hitch is moveable from a home position along a circuit around a reference point defined by the rotary tow coupling. The hitch is moved a selected direction along the circuit, the trailer moves left and right and forward and backward. One complete circuit of the hitch incrementally changes the angular orientation of the trailer relative to the tow vehicle. Using multiple trips around the circuit, the rotary tow coupling is capable of adjusting the angular orientation of the trailer relative to the tow vehicle between 90° and 270° without moving the tow vehicle.

14 Claims, 3 Drawing Sheets

ROTARY TOW COUPLING

BACKGROUND

Towing a trailer behind a vehicle is a common practice in commerce and for personal use. The trailer generally refers to any towed object including, but not limited to, commercial trailers pulled by a road tractor, horse trailers, utility trailers, boat trailers, and vehicle dollies. Regardless of the type of trailer and the experience of the driver, encountering difficulty in positioning the trailer at some point is inevitable. Various reasons for the difficulties exist including the arrangement of the tow coupling, the skill of the driver, environmental conditions, and physical constraints. In particular, backing a trailer is a counter-intuitive skill because the trailer turns in the opposite direction from the direction that the tow vehicle is turning. Backing a trailer is further complicated because the trailer is not rigidly coupled to the tow vehicle. As a result, even a slight difference in the angular orientation of the trailer relative to the tow vehicle results in the trailer straying from the intended path. Even when moving forward, difficulties can arise when the trailer slides or the tow vehicle slides. In both forward and backward operation, it is not uncommon for a trailer to become come into engagement with a fixed object. Often disengaging the trailer from the fixed object without damaging the object and/or the trailer is virtually impossible or beyond the skill of the driver. Similarly, some situations require precise positioning of the trailer that is beyond the skill of the driver. Finally, positioning may be hampered by conditions such as the lack of inadequate space to maneuver the trailer or lack of visibility. It is with regard to these considerations that the present invention has been developed.

BRIEF SUMMARY

This Brief Summary introduces selected general concepts and features of the various embodiments of the invention and should not be used to limit the scope of the claimed invention. In the various embodiments, the rotary tow coupling includes a base, a carriage, a hitch, and a drive mechanism. The base, if necessary, is securable to the tow vehicle and/or the trailer and provides a fixed support for the carriage and other components of the rotary tow coupling as needed. The carriage is operatively attached to the base in a manner that allows the carriage to rotate or to move relative to a reference point. The hitch is carried by the carriage and serves as the connection point for attaching the rotary tow coupling to the trailer or the tow vehicle. The drive mechanism includes a motor operatively connected to the carriage. An optional transmission is transfers power from the motor to the carriage. Operation of the motor causes the carriage to turn. An optional controller including a user interface allows control over the operation of the rotary tow controller. An optional lock mechanism is selectively engaged to prevent or allow movement of the carriage.

As the carriage moves, the position of the hitch moves between positions to the fore, aft, left, and right of the reference point. Moving the hitch between the fore and aft positions moves the trailer backward and forward relative to the tow vehicle with a corresponding change in the effective wheelbase of the trailer. The effective wheelbase is the distance from the reference point to the center point of the axle(s) on the trailer. Moving the hitch between the right and left positions changes the lateral offset of the hitch relative to the reference point with a corresponding change in the orientation of the trailer relative to the tow vehicle (i.e., a change in geometry). The combined effect of simultaneously changing the geometry and the effective wheelbase in a sequential manner causes the trailer to be laterally repositioned. In other words, moving the hitch through one complete circuit changes the angular relationship of the trailer and the tow vehicle without movement of the tow vehicle.

BRIEF DESCRIPTION OF THE DRAWINGS

Further features, aspects, and advantages of the invention represented by the embodiments described present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various embodiments of a rotary tow coupling are described herein and illustrated in the accompanying figures. The rotary tow coupling changes the angular orientation of a trailer relative to a tow vehicle without moving the tow vehicle. The rotary tow coupling is fixedly secured to the tow vehicle. The rotary tow coupling includes a hitch connectable to a trailer coupling. The hitch is moveable from a home position along a circuit around a reference point defined by the rotary tow coupling. The hitch is moved a selected direction along the circuit, the trailer moves left and right and forward and backward. One complete circuit of the hitch incrementally changes the angular orientation of the trailer relative to the tow vehicle. Using multiple trips around the circuit, the rotary tow coupling is capable of adjusting the angular orientation of the trailer relative to the tow vehicle between 90° and 270° without moving the tow vehicle.

Figure 1:
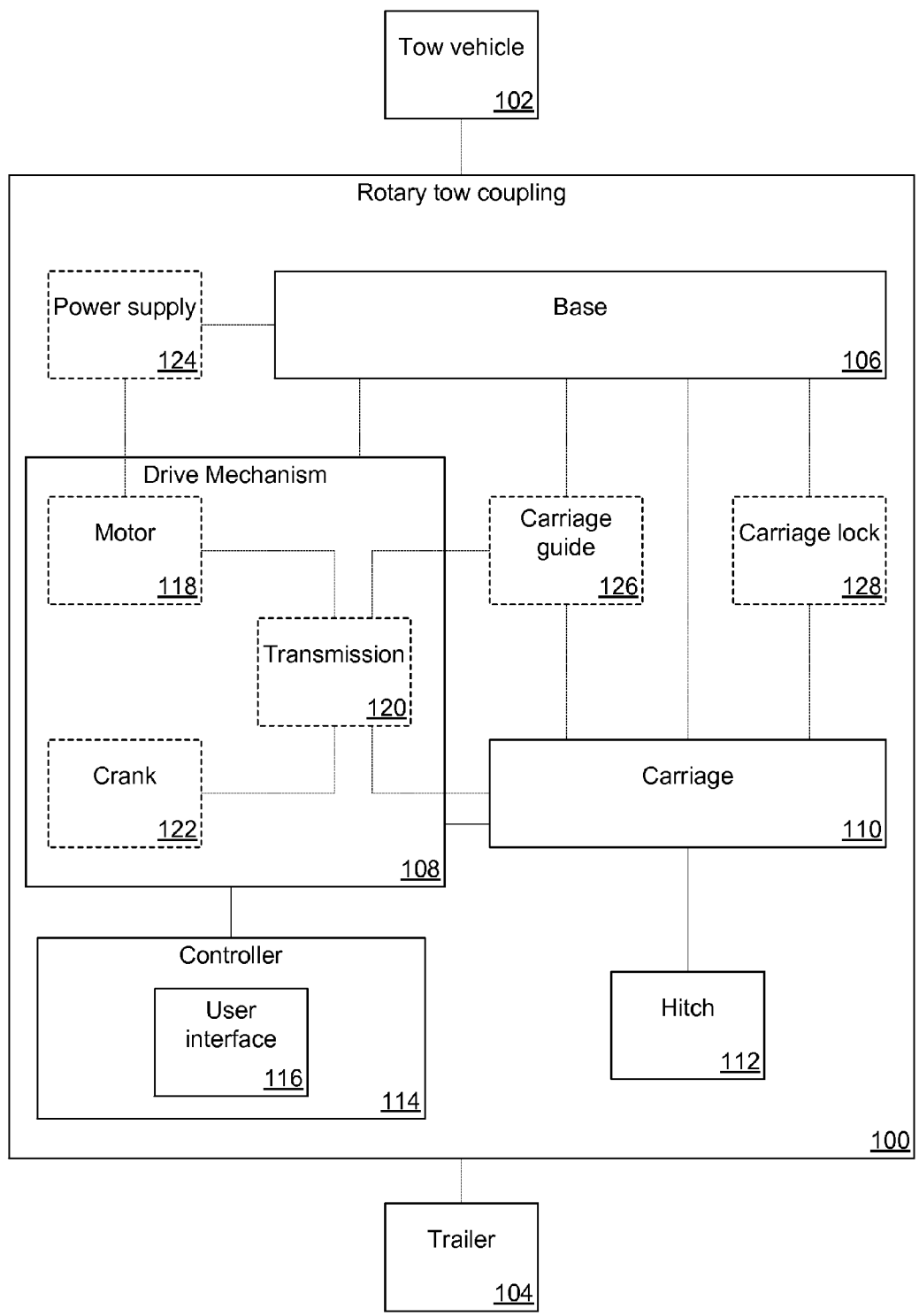
FIG. 1 is a block diagram of one embodiment of the rotary tow coupling.

FIG. 1 is a block diagram of one embodiment of the rotary tow coupling 100. The rotary tow coupling 100 operatively connects a tow vehicle 102 and a trailer 104. The rotary tow coupling 100 includes a base 106, a drive mechanism 108, a carriage 110, a hitch 112, and a controller 114. The base 106, if necessary, is securable to the tow vehicle and/or the trailer and provides a fixed support for the carriage 110 and other selected components of the rotary tow coupling as needed. The carriage 110 is operatively attached to the base 106 in a manner that allows the carriage to rotate or to move relative to a reference point. The hitch 112 is carried by the carriage 110 and serves as the connection point for attaching the rotary tow coupling 100 to the trailer 104 or the tow vehicle 102. The drive mechanism 108 is operatively connected to the carriage 110. Operation of the drive mechanism 108 causes the carriage 110 and, therefore, the hitch 112 to move. A controller 114 including a user interface 116 provides control over the operation of the rotary tow coupling 100. In various embodiments, the rotary tow coupling is attached to the tow vehicle and the hitch is of a type normally found on a tow vehicle. In other embodiments, the rotary tow coupling is attached to the trailer and the hitch is of a type normally found on a trailer. In various embodiments, some or all of the components of the rotary tow coupling 100 are contained within a housing. The housing offers protection for the components and shields the drive mechanism from objects that might interfere with proper operation.

The configuration of the base 106 varies based on the type of connection the tow vehicle or the trailer. In various embodiments, the base is a mounting plate that attaches in the bed of a pickup truck (or car), to a road tractor, or to a trailer. In some embodiments, the base is configured to be mounted in place of a fifth wheel tow coupling. In other embodiments, the base is configured for attachment to a receiver-type tow hitch. In some embodiments, the base includes plate with an extension that is received by the tow hitch receiver in place of the standard tow hitch.

Movement of the carriage 110 is designed to carry the hitch 112 through one complete circuit. Various embodiments of the carriage include a plate, disc, wheel, or similar object that rotates on a pivot pin or shaft. In some embodiments, the carriage is a plate, ring, or similar object that is rotates on a low friction surface, such as a bearing surface. In some embodiments, the low friction surface is integrated into the carriage. In various embodiments, the travel path of the carriage is determined by a carriage guide 126. Examples of suitable guides include, but are not limited to, a track, a slot and tab, and an inner or outer wall. One suitable and efficient design for the carriage is a circular plate; however, other shapes may be used for the plate. In various embodiments, the carriage is a mobile object travelling along a raceway or track.

An optional carriage lock 128 is selectively engaged to prevent or allow movement of the carriage. In various embodiments, the carriage lock 128 secures the carriage 110 to hold the hitch 112 in the home position for towing and releases the carriage 110 for repositioning the trailer. In some embodiments, the carriage lock 128 also allows the carriage to be locked when the hitch is in positions other than the home position. Examples of a suitable lock include one or more pins that engage openings in the carriage and the base to prevent rotation of the carriage. In various embodiments, the lock is a manually operated lock. In other embodiments, the lock is automatically operated via the drive mechanism. In some embodiments, the automatically operated lock is operated via the controller 114.

The configuration of the drive mechanism 108 used to impart motion to the carriage varies based on the factors including, but not limited to, the desired load rating, power consumption, cost, size, reliability, and environmental factors. In various embodiments, the force to move the carriage is provided by a motor 118 or other device providing mechanical leverage. Suitable motors include, but are not limited, electric motors and physically powered motors (i.e., pneumatic and hydraulic motors). In some embodiments, the motor is secured to the base. In other embodiments, the base and the motor are independently located and mounted. In various embodiments, the drive mechanism includes a transmission 120 that transfers power from the motor to the carriage. In other embodiments, a direct drive motor is used eliminating the need for a transmission. Suitable types of transmissions include, but are not limited to, gearboxes, chains, belts, and sprockets. In some embodiments, the force to move the carriage is provided manually through a device providing a mechanical advantage, such as a crank 122 driving the transmission 120 (e.g., a gear mechanism). In various embodiments, the drive mechanism is reversible to allow the carriage to travel in both the clockwise and counterclockwise directions. In various embodiments, the drive mechanism 108 is powered by the vehicle power supply (i.e., the vehicle electrical system). In other embodiments, the rotary tow coupling 100 includes an optional power supply 124 (e.g., a fuel tank or battery). In some embodiments, the motor 118 travels with and propels the carriage 110 along the track or raceway. In other embodiments, the transmission forms a part of or cooperates with the track or raceway to move the carriage.

The controller 114 provides control over the functions and operation of the rotary tow coupling 100 via the user interface 116. In some embodiments, the rotary tow coupling is remotely operable from within the tow vehicle. In some embodiments, the rotary tow coupling is operable from outside the tow vehicle. The controller 114 may communicate with the rotary tow coupling through a wired interface or a wireless interface. In various embodiments, the user interface 116 allows control over operating parameters including, but not limited to, the direction of travel of the hitch, the number of complete circuits made by the hitch, and the target angular orientation of the trailer relative to the tow vehicle through physical controls (e.g., buttons, switches, dials, and levers) or virtual controls (e.g., computer generated controls on touch screen).

The configuration of the hitch 112 varies based on the type of connection employed by the trailer. Suitable hitch configurations include, but are not limited to, a receiver accepting a trailer kingpin, a kingpin, a tow ball, a trailer coupling slipping over a tow ball, a lunette ring, and a pintle hook. In various embodiments, the carriage defines one or more mount openings (e.g., a tow ball mount) selectively accepting various interchangeable hitches to allow the type or size of the hitch to be varied. In other embodiments, the carriage includes multiple hitches positioned at various locations. For example, the carriage may have different sized tow balls positioned at selected locations and an opening for receiving a kingpin at another location.

FIGS. 2A-2E illustrate the movement of a trailer achieved using one embodiment of the rotary tow coupling as the hitch makes one complete circuit. Generally, FIGS. 2A-2E show the tow vehicle, the rotary tow coupling, and the trailer. The illustrated embodiment of the rotary tow coupling is configured as a fifth wheel tow coupling mounted in the tow vehicle. In the illustrated embodiment, the base is plate or similar structure secured in a fixed position in the bed of the tow vehicle. The carriage is a plate that is operatively attached to the base via a pivot pin that allows the carriage to rotate and defines a fixed reference point 200.

As the carriage turns, the hitch makes a circuit around the reference point. During the circuit, the hitch moves between positions located to the fore, aft, left, and right of the reference point. Moving the hitch between the fore and aft positions moves the trailer backward and forward relative to the tow vehicle with a corresponding change in the effective wheelbase of the trailer. The effective wheelbase, WBE, is the distance from the reference point to the center point of the axle(s) on the trailer. Moving the hitch between the right and left positions changes the lateral offset of the hitch relative to the reference point with a corresponding change in the orientation of the trailer relative to the tow vehicle (i.e., a change in geometry). The combined effect of simultaneously changing the geometry and the effective wheelbase in a sequential manner causes the trailer to be laterally repositioned. In other words, moving the hitch through one complete circuit changes the angular relationship of the trailer and the tow vehicle without movement of the tow vehicle.

In order to provide a frame of reference to aid in describing the operation of the rotary tow coupling, the direction that the tow vehicle faces is referred to as the forward direction 202 and defines an angular orientation of 0° relative to the reference point 200. Conversely, the direction opposite of the forward direction is referred to as the reverse direction. The longitudinal axis 204 of the rotary tow coupling passes through the reference point and runs lengthwise (i.e., front-to-back) through the tow vehicle 102. The lateral axis 206 of the rotary tow coupling passes through the reference point and runs lengthwise (i.e., side-to-side) along the tow vehicle 102.

Figure 2A:
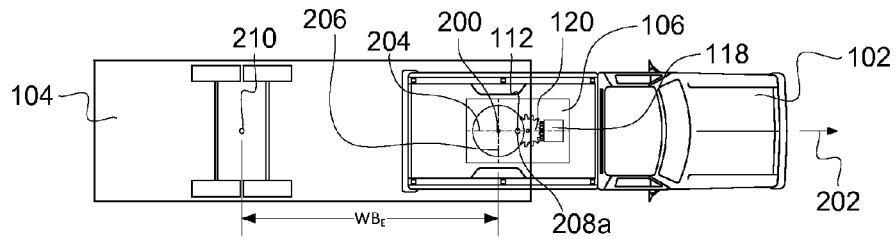
FIGS. 2A-2E is a sequence of illustrations shown the movement of the trailer relative to the tow vehicle at selected points as the hitch moves through one complete circuit.

In FIG. 2A, the trailer 104 is axially aligned with the tow vehicle 102. In other words, the trailer extends away from the tow vehicle at an angle of approximately 180°. The normal location of the hitch 112 during towing is the home position 208a. In various embodiments, the home position 208a is axially aligned with the tow vehicle. In the illustrated embodiment, the home position is offset from the reference point by a selected distance and lies on the longitudinal axis 204 in the forward direction. In other embodiments, the home position is offset from the reference point by a selected distance and lies on the longitudinal axis in the reverse direction. Prior to movement of the hitch, the distal end of the trailer is axially aligned with the forward direction (i.e., zero offset). In the illustrated embodiment, the effective wheelbase of the trailer is the smallest when the hitch is in the home position. For the purpose of comparison, the starting position of the trailer is shown in phantom in FIGS. 2B-2E.

Figure 2B:
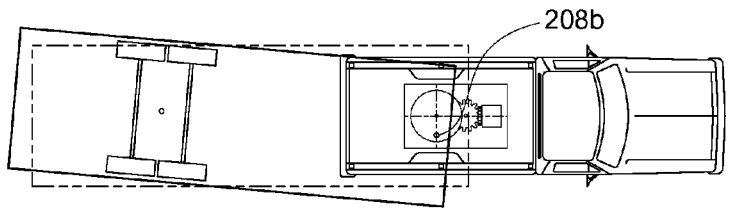

In FIG. 2B, the hitch has been moved from the home position 208a to a first side position 208b. The first side position is the position with the greatest lateral offset relative to the reference point reached by the hitch when traveling from the home position to the destination position (i.e., the position on the opposite side of the reference point longitudinally aligned with the home position). In the illustrated embodiment, the hitch travels along the circuit in a clockwise direction and the first side position is the orthogonal position to the right of the reference point when facing the forward direction. The angular motion of the hitch during the first leg of the circuit moves the hitch in the direction of the trailer (i.e., a pushing motion). Simultaneously, the angular motion increases the lateral offset of the hitch relative to the reference point moving the hitch out of axial alignment with the trailer. The effect of the lateral movement of the hitch is to generally cause the trailer to pivot about the center point 210 of the trailer axle(s). The combined effect of the angular movement of the first leg of the circuit is to push the trailer in the same general direction as the angular motion of the hitch (i.e., the clockwise direction) at a gradually increasing angle relative to the longitudinal axis 204. Alternatively, the combined effect of the angular movement of the first leg of the circuit is described as displacing the center point of the axle(s) of the trailer relative to the longitudinal axis 204 and simultaneously moving the center point of the axle(s) of the trailer further away from the reference point (i.e., increasing the effective wheelbase of the trailer).

Figure 2C:
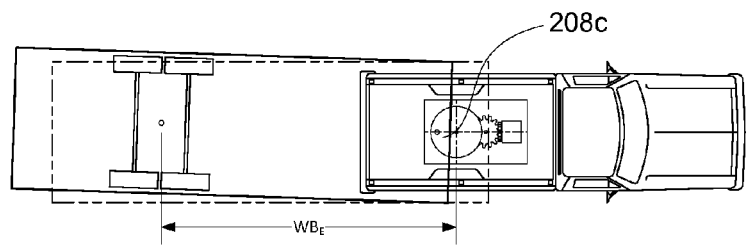

In FIG. 2C, the hitch has been moved from the first side position to the destination position 208c. During this leg of the circuit, the distal end of the trailer continues to move backward. The decreasing lateral distance from the reference point to the hitch causes the trailer to begin straightening up. The angular motion of the hitch during the second leg of the circuit continues to moves the hitch in the direction of the trailer. Simultaneously, the angular motion decreases the lateral offset of the hitch relative to the reference point bringing the hitch closer to axial alignment with the trailer. The effect of the lateral movement of the hitch is to generally cause the trailer to pivot about the center point 210 of the trailer axle(s). The combined effect of the angular movement of the second leg of the circuit is to push the trailer away from the tow vehicle in the same general direction as the angular motion of the hitch (i.e., the clockwise direction) but at a gradually decreasing angle relative to the longitudinal axis 204. Alternatively, the combined effect of the angular movement of the second leg of the circuit is described as continuing to displace the center point of the axle(s) of the trailer relative to the longitudinal axis 204 and to increase the effective wheelbase of the trailer.

Figure 2D:
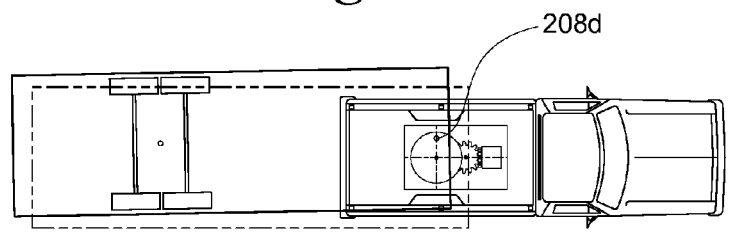

In FIG. 2D, the hitch has been moved from the reverse position to a second side position 208d. The second side position is the position with the greatest lateral offset relative to the reference point reached by the hitch when returning from the destination position to the home position. The second side position is located on the opposite side of the reference point from the first side position. In the illustrated embodiment, the second side position is the orthogonal position to the left of the reference point when facing the forward direction. The angular motion of the hitch during the third leg of the circuit begins to move the hitch in the direction away from the trailer. Simultaneously, the angular motion increases the lateral offset of the hitch relative to the reference point moving the hitch farther from axial alignment with the trailer. The effect of the lateral movement of the hitch is to generally cause the trailer to pivot about the center point 210 of the trailer axle(s). The combined effect of the angular movement of the third leg of the circuit is to pull the trailer toward the tow vehicle in the same general direction as the angular motion of the hitch (i.e., the clockwise direction) at a gradually increasing angle relative to the longitudinal axis 204. Alternatively, the combined effect of the angular movement of the third leg of the circuit is described as continuing to displace the center point of the axle(s) of the trailer relative to the longitudinal axis 204 while simultaneously moving the center point of the axle(s) of the trailer closer to the reference point (i.e., decreasing the effective wheelbase of the trailer).

Figure 2E:
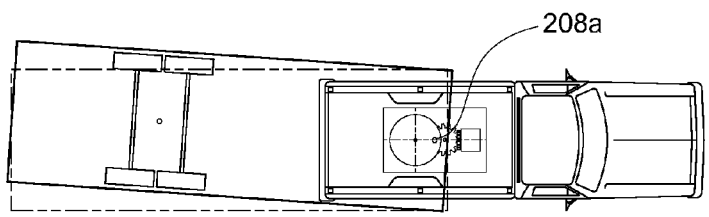

In FIG. 2E, the hitch has returned to the home position after making one complete circuit around the reference point 200. The angular motion of the hitch during the final leg of the circuit continues to move the hitch in the direction away from the trailer. Simultaneously, the angular motion decreases the lateral offset of the hitch relative to the reference point bringing the hitch closer to axial alignment with the trailer. The effect of the lateral movement of the hitch is to generally cause the trailer to pivot about the center point 210 of the trailer axle(s). The combined effect of the angular movement of the final leg of the circuit is to continue pulling the trailer toward the tow vehicle in the same general direction as the angular motion of the hitch (i.e., the clockwise direction) at a gradually decreasing angle relative to the longitudinal axis 204. Alternatively, the combined effect of the angular movement of the final leg of the circuit is described as further displacing the center point of the axle(s) of the trailer relative to the longitudinal axis 204 while simultaneously decreasing the effective wheelbase of the trailer.

As illustrated in FIGS. 2A-2E, the cumulative effect of the angular motion of the hitch during each leg of the circuit is to displace the center point of the axle(s) of the trailer in the opposite direction as the starting lateral direction of travel of the hitch. By completing additional circuits in the same direction, the lateral position (i.e., the angular offset of the trailer relative to the tow vehicle) is further changed. Starting with the trailer axially aligned with the tow vehicle, the rotary tow coupling is capable of walking the trailer 90° in either direction (i.e., from 180° to 90° or from 180° to 270° relative to the longitudinal axis) by repeating the travel of the hitch around the reference point. With completion of the sufficient circuits, the rotary tow coupling is capable of walking the trailer 180° in either direction (from 90° to 270° relative to the longitudinal axis and vice versa) when the trailer begins in an orthogonal orientation relative to the tow vehicle.

The circuit describes a closed path travelled by the hitch. In other words, the hitch begins and ends the circuit at a home position. Suitable geometries for the circuit include, but are not limited to, circles, ellipses, rhombi, squares, and other polygons. The reference point is centrally located relative to the extents of the circuit. A longitudinal plane passing through reference point divides the circuit into a fore section and an aft section. A lateral plane passing through the reference point divides the circuit into a left section and a right section. In various embodiments, the circuit exhibits fore-aft symmetry and left-right symmetry. The extents define the furthest points of the circuit located along or proximate to the longitudinal plane and the lateral plane. In general, the extents of the circuit coincide with the vertices of the path geometry. The precise shape of the carriage and/or the circuit traveled by the hitch is not critical so long as the hitch is moved in a first lateral direction relative to the reference point as the trailer is moved backward and in the opposite lateral direction as the trailer is moved forward.

The amount of movement of the trailer relative to the tow vehicle for each completion of the circuit is based on the distance from the reference point to the hitch and the distance from the hitch to the point defined by the axle(s) of the trailer. Increasing the distance from the reference point to the hitch and/or decreasing distance from the hitch to the axle(s) of the trailer, increases the change in angular orientation of the trailer relative to the tow vehicle that occurs each time the hitch completes the circuit. Conversely, decreasing the distance from the reference point to the hitch and/or increasing distance from the hitch to the axle(s) of the trailer, increases the movement of the trailer relative to the tow vehicle that occurs each time the hitch completes the circuit.

In embodiments where the path traveled by the hitch is circular, the lateral movement of the trailer achieved by moving the hitch through one complete circuit around the reference point, l, is estimated by $$l = \frac{\pi r^2}{w}, \quad (1)$$

where r is the radius of the circle traveled by the hitch (i.e., the distance from the reference point to the hitch) and w is the distance from the reference point to the center point of the axle(s) of the trailer.

Figure 3:
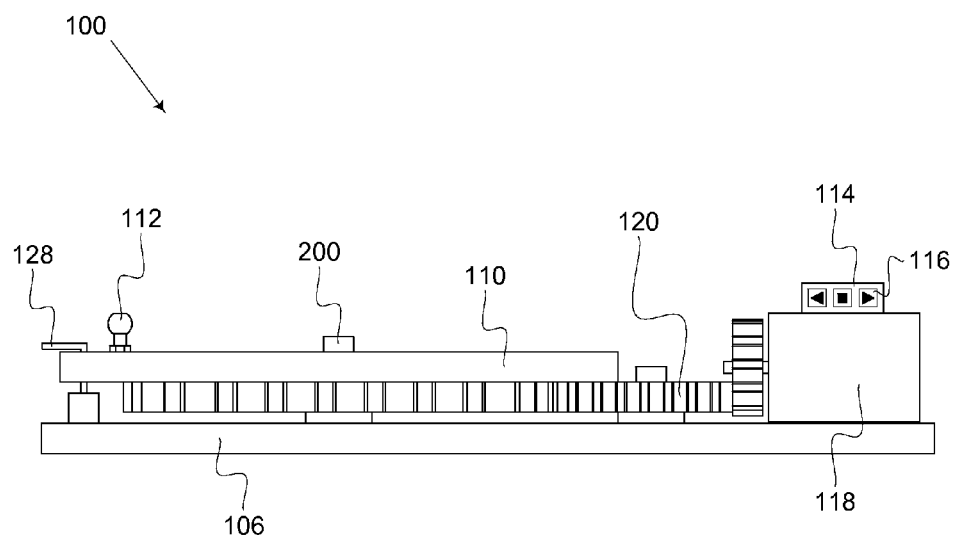
FIG. 3 is a side elevation view of one embodiment of the rotary tow coupling.

FIG. 3 is a side elevation view of one embodiment of the rotary tow coupling 100 including a circular plate as the carriage 110 moveably connected to the base 106 via a pivot pin 200, a motor 118 driving the carriage 110, a gearbox as the transmission 120 between the motor 118 and the carriage 110, a tow ball as the hitch 112 attached to the carriage 110, a carriage lock 128 in the locked position, and a controller 114 with a user interface 116. The user interface 116 includes a right/clockwise direction button, a left/counterclockwise button, and a stop button.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. An apparatus for changing an angular orientation of a trailer relative to a tow vehicle without moving the tow vehicle, the trailer having at least one axle and a center point defined by the at least one axle, said apparatus comprising:
    a base;
    a pivot pin connected to said base;
    a carriage plate operatively connected to said pivot pin, said carriage plate rotatable about said pivot pin in a clockwise direction and a counterclockwise direction;
    a hitch connected to said carriage plate at a selected distance from said pivot pin, said hitch connectable to one of the tow vehicle and the trailer, said hitch moveable to a first position with a first distance between said pivot pin and the center point of the at least one axle of the trailer, said hitch moveable to a second position with a second distance between said pivot pin and the center point of the at least one axle of the trailer, said second distance being greater than said first distance, said hitch moveable in a first lateral direction to change the angle between said pivot pin and the center point of the at least one axle of the trailer while moving from said first position to said second position, said hitch moveable in a second lateral direction opposite to said first lateral direction to change the angle between said pivot pin and the center point of the at least one axle of the trailer while moving from said second position to said first position; and
    a motor operatively connected to said carriage plate to drive said carriage plate in said clockwise direction and said counterclockwise direction to move said hitch in a circuit from said first position to said second position and back to said first position.

2. The apparatus of claim 1 further comprising:
    a user interface comprising at least one control for selecting a direction of travel of the carriage plate; and
    a controller in communication with said motor, said controller actuating said motor to move said carriage plate in said direction of travel.

3. The apparatus of claim 1 further comprising:
    a home position associated with said hitch, said hitch being placed in said home position when the towing vehicle is actively towing the trailer; and
    a carriage lock being selectively lockable when said hitch is in said home position, said carriage lock preventing rotation of said carriage plate when locked.

4. The apparatus of claim 1 further comprising a carriage lock preventing movement of said carriage when locked to secure said hitch in a selected position.

5. The apparatus of claim 1 further comprising a transmission in operative communication between said motor and said carriage.

6. An apparatus for changing an angular orientation of a trailer relative to a tow vehicle without moving the tow vehicle, said apparatus comprising:

a base member;

a carriage moveably connected to said base member;

a reference point positioned in a substantially central location relative to said carriage;

a first position lying in a first direction relative to said reference point;

a second position lying in a second direction relative to said reference point, said second direction being substantially orthogonal to said first direction;

a third position lying in a third direction relative to said reference point, said third direction being substantially opposite to said first direction;

a fourth position lying in a fourth direction relative to said reference point, said fourth direction being substantially orthogonal to said first direction and substantially opposite to said second direction;

a drive mechanism operatively connected to and moving said carriage clockwise and counterclockwise relative to said reference point; and a hitch carried by said carriage to each of said first position, said second position, said third position, and said fourth position.

7. The apparatus of claim 6 characterized in that said drive mechanism comprises a motor operatively connected to said carriage to selectively drive said carriage clockwise and counterclockwise relative to said reference point.

8. The apparatus of claim 7 characterized in that said drive mechanism further comprises a transmission operatively connected between said motor and said carriage to communicate movement of said motor to the said carriage.

9. The apparatus of claim 6 further comprising a carriage guide defining a track around said reference point, said carriage operatively engaging said carriage guide, said carriage moved along said carriage guide by operation of said drive mechanism.

10. The apparatus of claim 6 further comprising a carriage lock preventing movement of said carriage when locked, said carriage lock being selectively lockable.

11. The apparatus of claim 6 further comprising a carriage lock preventing movement of said carriage when locked to secure said hitch in a selected position.

12. The apparatus of claim 6 characterized in that a distance from said reference point to a location positioned relative to an axle of the trailer corresponds to a wheelbase of the trailer, the wheelbase having a first value when said hitch is in said first position and a second value when said hitch is in said third position, said second value being greater than said first value.

13. The apparatus of claim 12 characterized in that:

said hitch travels through said second position while traveling from said first position to said third position and through said fourth position while traveling from said third position to said first position when said carriage moves in a clockwise direction; and said hitch travels through said second position while traveling from said third position to said first position and through said fourth position while traveling from said first position to said third position when said carriage moves in a counterclockwise direction.

14. The apparatus of claim 6 characterized in that said first position, said second position, said third position, and said fourth position are equidistant from said reference point.

* * * * *